United States Patent
Telep et al.

(10) Patent No.: US 9,109,708 B2
(45) Date of Patent: Aug. 18, 2015

(54) ENGINE BREATHING SYSTEM VALVE AND PRODUCTS INCLUDING THE SAME

(75) Inventors: Robert J. Telep, Livonia, MI (US); Peter G. Weissinger, Sterling Hts., MI (US)

(73) Assignee: BorgWarner Inc., Auburn Hills, MI (US)

(*) Notice: Subject to any disclaimer, the term of this patent is extended or adjusted under 35 U.S.C. 154(b) by 142 days.

(21) Appl. No.: 13/384,247

(22) PCT Filed: Aug. 4, 2010

(86) PCT No.: PCT/US2010/044365
§ 371 (c)(1),
(2), (4) Date: Apr. 4, 2012

(87) PCT Pub. No.: WO2011/017407
PCT Pub. Date: Feb. 10, 2011

(65) Prior Publication Data
US 2012/0181468 A1    Jul. 19, 2012

Related U.S. Application Data

(60) Provisional application No. 61/231,044, filed on Aug. 4, 2009.

(51) Int. Cl.
*F16K 1/22* (2006.01)
*F16K 1/20* (2006.01)
(Continued)

(52) U.S. Cl.
CPC ......... *F16K 1/2028* (2013.01); *F01M 13/0011* (2013.01); *F02M 25/06* (2013.01); *F16K 1/224* (2013.01); *F16K 1/222* (2013.01); *F16K 1/226* (2013.01); *Y02T 10/121* (2013.01)

(58) Field of Classification Search
CPC ....... F16K 1/2028; F16K 1/224; F16K 1/222; F16K 1/226; F02M 25/06; F01M 13/011; Y02T 10/121
USPC ............ 251/173, 304–306; 60/599, 600, 602, 60/605.2; 123/559.1, 568.11, 568.19, 123/568.2, 336–337
See application file for complete search history.

(56) References Cited

U.S. PATENT DOCUMENTS 3,556,476 A * 1/1971 Norman H. Haenky ...... 251/306
4,265,426 A * 5/1981 Thurston et al. ............. 251/306
(Continued)

FOREIGN PATENT DOCUMENTS

CN    2185354 Y    12/1994
EP    0307733 A2    3/1989
(Continued)

OTHER PUBLICATIONS
Chinese Office Action dated Jul. 23, 2013; Applicant: BorgWarner Inc; Application No. 2018033574.9; 14 pages.
(Continued)

*Primary Examiner* — Marina Tietjen
(74) *Attorney, Agent, or Firm* — BrooksGroup

(57) ABSTRACT

One embodiment may include an engine breathing system valve (10) for an internal combustion engine breathing system (12) including a valve body (60), a stem (62), and a valve member (64). The valve body (60) has a port (66) with a center axis (CP). The valve body (60) may have a seating surface (68) lying along a cone outer surface (CS) of an imaginary cone (C). The imaginary cone (C) has a cone center axis (CA). The stem (62) is carried by the valve body (60) so that it can rotate. The stem (62) has an axis of rotation (R-i) radially offset from the port center axis (CP). The valve member (64) is connected to the stem (62) and may have a valve member plane (M) axial ly offset from the axis of rotation (R-i).

17 Claims, 5 Drawing Sheets

(51) Int. Cl.
  *F01M 13/00* (2006.01)
  *F02M 25/06* (2006.01)
  *F16K 1/226* (2006.01)

(56) References Cited

U.S. PATENT DOCUMENTS

| | | | |
|---|---|---|---|
| 4,281,817 A * | 8/1981 | Adams et al. | 251/305 |
| 5,356,116 A * | 10/1994 | Morgan et al. | 251/308 |
| 2005/0016602 A1 | 1/2005 | Schub et al. | |
| 2006/0021327 A1* | 2/2006 | Kiser et al. | 60/278 |
| 2010/0018204 A1* | 1/2010 | McEwen et al. | 60/600 |
| 2011/0272613 A1* | 11/2011 | Watanuki et al. | 251/314 |

FOREIGN PATENT DOCUMENTS

| | | | |
|---|---|---|---|
| JP | S5078922 A | | 6/1975 |
| JP | H08-75013 A | | 3/1996 |
| KR | 930006506 B1 | | 7/1993 |
| KR | 2000017278 U | | 9/2000 |
| WO | WO2009030914 | * | 3/2009 |
| WO | WO2009069240 | * | 6/2009 |

OTHER PUBLICATIONS

Chinese Office Action dated May 15, 2014 ; Application No. 201080033574.9 ; Applicant : Borg Warner Inc. ; 21 pages.

* cited by examiner

ENGINE BREATHING SYSTEM VALVE AND PRODUCTS INCLUDING THE SAME

This application claims the benefit of U.S. Provisional Application Ser. No. 61/231,044 filed Aug. 4, 2009.

TECHNICAL FIELD

The technical field generally relates to products including valves that regulate fluid-flow in an internal combustion engine breathing system.

BACKGROUND

Internal combustion engines are often equipped with breathing systems to, among other things, decrease emissions and increase engine efficiency. The systems may include one or more turbochargers, one or more exhaust gas recirculation (EGR) assemblies, and other components. Valves and passages are commonly located throughout the systems to regulate fluid-flow between the exhaust breathing system components.

SUMMARY OF EXEMPLARY EMBODIMENTS OF THE INVENTION

One exemplary embodiment includes a product which may include an engine breathing system valve. The engine breathing system valve may be located within a passage of an engine breathing system in order to regulate fluid-flow in the passage. The engine breathing system valve may include a valve body, a stem, and a valve member. The valve body may have a port with a center axis and may have a seating surface. The seating surface may lie along a cone outer surface of an imaginary cone. The imaginary cone has a cone center axis which may be at an acute angle with respect to the port center axis so that, in cross-sectional profile, an upper portion of the seating surface may be at a different angle with respect to the port center axis than a lower portion of the seating surface. The stem may be carried by the valve body so that it can rotate thereabout. The stem may be carried at a location that may be away from the seating surface. The stem has an axis of rotation that may be radially offset from the port center axis. The valve member may be connected to the stem so that it can rotate with the stem. The valve member has a valve member plane lying parallel to a valve face of the valve member. The valve member plane may, when in a closed position, be axially offset from the axis of rotation.

One exemplary embodiment includes a product which may include an engine breathing system valve. The engine breathing system valve may be located in a passage of an engine breathing system and may regulate fluid-flow in the passage. The engine breathing system valve may include a valve body, a stem, and a valve member. The valve body may have a port and a seating surface. The seating surface may lie along a cone outer surface of an imaginary cone. The imaginary cone may have a cone center axis which may be parallel to a center axis of the port. In cross-sectional profile, an upper portion of the seating surface may be at an acute angle with respect to the port center axis, and a lower portion of the seating surface may be at an acute angle with respect to the port center axis. The stem may be rotatably carried by the valve body at a location that may be away from the seating surface. The stem may have an axis of rotation that is radially offset from the port center axis. The valve member may be connected to the stem and may rotate with the stem. The valve member may have a valve member plane that is defined parallel to a valve face of the valve member. The valve member plane may be, when the valve member is in a closed position, at an acute angle with respect to a vertical axis of the port.

One exemplary embodiment includes a product which may include an upper housing of a turbocharger component, a lower housing of the turbocharger component, and an engine breathing system valve positioned between the upper housing and the lower housing. The engine breathing system valve may regulate fluid-flow in the turbocharger component. The engine breathing system valve may include a valve body, a stem, and a valve member. The valve body may have a port and a seating surface. The seating surface may lie along a cone outer surface of an imaginary cone. The imaginary cone may have a cone center axis which may be parallel to a center axis of the port. In cross-sectional profile, an upper portion of the seating surface may be at an acute angle with respect to the port center axis, and a lower portion of the seating surface may be at an acute angle with respect to the port center axis. The stem may be rotatably carried by the valve body at a location that may be away from the seating surface. The stem may have an axis of rotation that is radially offset from the port center axis. The valve member may be connected to the stem and may rotate with the stem. The valve member may have a valve member plane that is defined parallel to a valve face of the valve member. The valve member plane may be, when the valve member is in a closed position, at an acute angle with respect to a vertical axis of the port.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

The figures illustrate an exemplary embodiment of an engine breathing system valve 10 that may be used in an internal combustion engine breathing system 12 for internal combustion engines including, but not limited to, gasoline, diesel, and alternative fuels. The valve 10 may be used at various locations in the engine breathing system 12 including, but not limited to, in a turbocharger 14 and in an exhaust gas recirculation (EGR) assembly 16. The valve 10 may be designed to prevent leakage when the valve is at a closed position, even at low engine speeds. The valve 10 may also improve the resolution of mass fluid-flow through the valve as compared to other valves such as flap valves. In exemplary embodiments, the valve 10 and an associated port may have a generally cylindrical and elliptical shape which define various directions with respect to the shape; in this sense, the term "radially" refers to a direction that is generally along an imaginary radius of the shape, the term "axially" refers to a direction that is generally parallel to an imaginary center axis of the shape, and the term "circumferentially" refers to a direction that is generally along an imaginary circumference of the shape.

Figure 1:
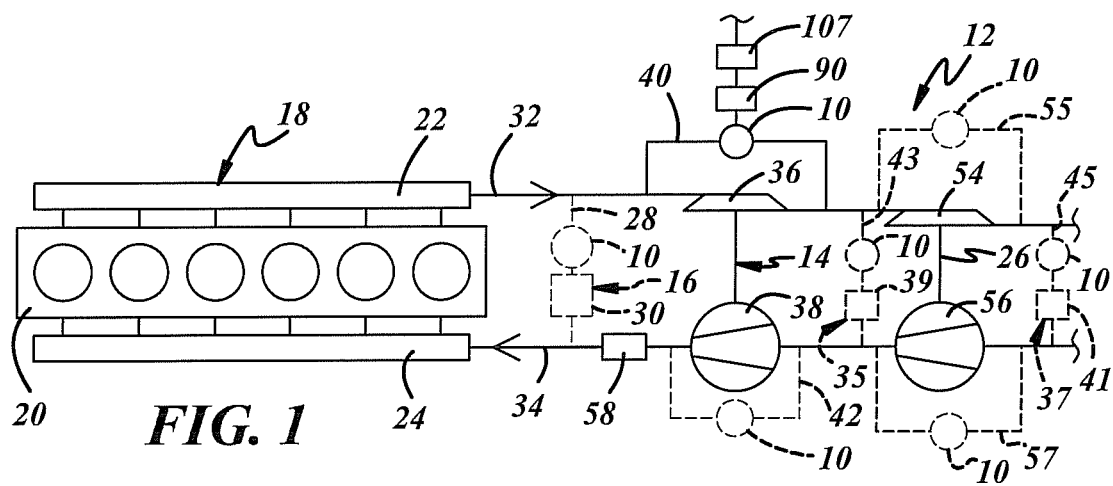
FIG. 1 is a schematic of an exemplary embodiment of an internal combustion engine breathing system.

Referring to FIG. 1, an internal combustion engine 18 combusts fuel and expels fluid in the form of exhaust gasses to the engine breathing system 12. The internal combustion engine 18 may be a spark-ignited engine or a diesel engine. The example shown is a diesel engine that may be of different types having different arrangements and different numbers of cylinders (e.g., in-line, V-type, V-6, V-8, etc.). A cylinder block 20 may define multiple piston bores. An exhaust manifold 22 may be equipped on an exhaust side of the internal combustion engine 18 to direct fluid-flow, such as the exhaust gasses, exhaled from the engine and to the engine breathing system 12. An intake manifold 24 may be equipped on an intake side of the internal combustion engine 18 to direct and supply air and/or air-fuel mixture to the engine.

The engine breathing system 12 may be used with the internal combustion engine 18 to manage fluid-flow supplied to, and expelled from the engine. The engine breathing system 12 may have various arrangements and various engine breathing system components. The example shown in FIG. 1 may include the EGR assembly 16, the high pressure stage turbocharger 14, and a low pressure stage turbocharger 26.

The EGR assembly 16 may direct exhaust gas back into the intake manifold 24. The EGR assembly 16 may have various arrangements and various components. The example shown may include an EGR passage 28 that allows fluid-flow between the exhaust and intake manifolds 22 and 24, an EGR cooler 30, and an EGR valve such as the valve 10. The EGR cooler 30 may be a heat exchanger that cools the exhaust gasses that flow therethrough. The EGR valve regulates exhaust gas fluid-flow from an exhaust passage 32 and to an intake passage 34. The example EGR assembly 16 is a high pressure EGR assembly; in other examples, a first low pressure EGR assembly 35, a second EGR assembly 37, or both may also be included. Like the high pressure EGR assembly 16, the low pressure EGR assemblies 35, 37 may also include an EGR cooler 39, 41, an EGR passage 43, 45, and an EGR valve such as the valve 10.

The high pressure stage turbocharger 14 is driven by exhaust gas fluid-flow to force an additional amount of air into the internal combustion engine 18. The turbocharger 14 may be various types, and may include a turbine 36 that is directly driven by the exhaust gas fluid-flow and that in turn drives a compressor 38 via a shaft. The compressor 38 pressurizes air that eventually enters the internal combustion engine 18. The turbocharger 14 may also include a bypass passage 40, or a waste gate passage, which diverts exhaust gasses around the turbine 36. A bypass valve, such as the valve 10, may be located within the bypass passage 40 to regulate fluid-flow through the bypass passage. Another bypass passage 42 may be included to divert intake air around the compressor 38. Again, a bypass valve, such as the valve 10, may be located within the bypass passage 42 to regulate fluid-flow through the bypass passage.

Figure 9:
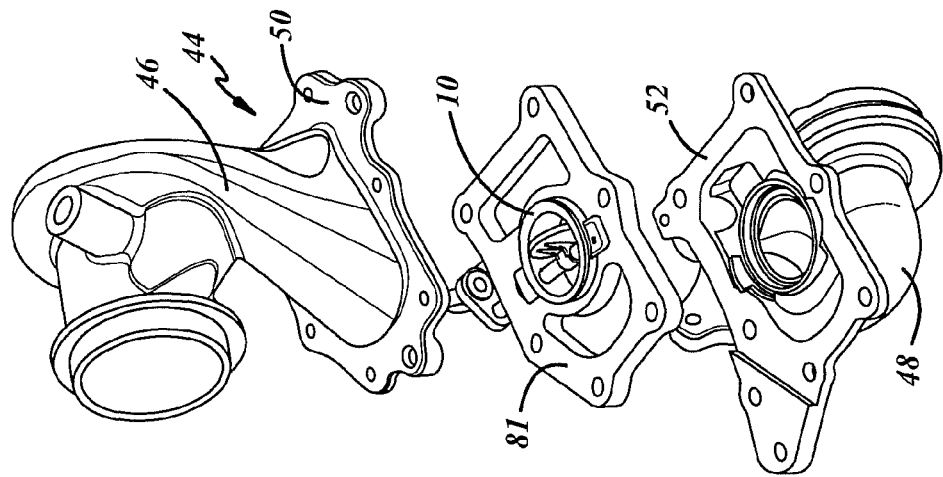
FIG. 9 is an exploded view of an exemplary embodiment of a turbine housing with the valve of FIG. 2 positioned therein.
Figure 6:
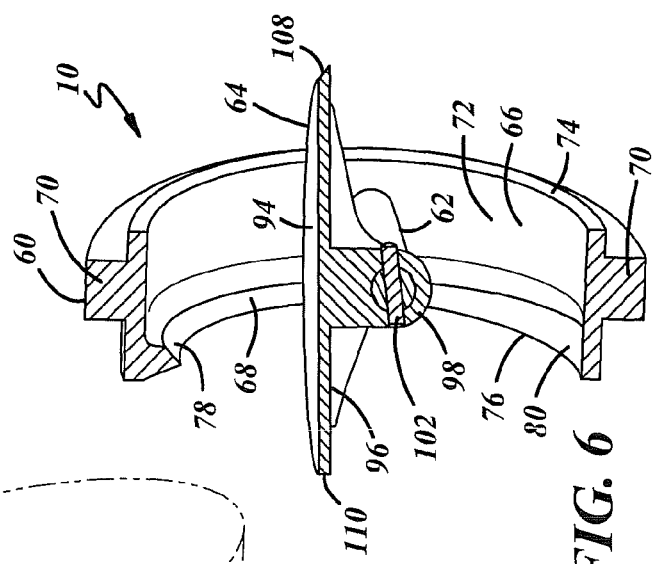
FIG. 6 is another sectional view of the valve of FIG. 2, showing the valve in an open position.

The turbocharger 14 may further include a housing to support the turbine 36 and the compressor 38. The housing may include a portion covering the turbine 36 and a separate portion covering the compressor 38. One of the portions or both of the portions may include the bypass passage(s) 40, 42. Referring to FIG. 9, a turbine housing 44 may include an upper housing 46 and a separate lower housing 48. The upper housing 46 may have a first flange 50 for mounting, and the lower housing 48 may have a second flange 52 for mounting. The first and second flanges 50, 52 may be connected together or may be connected to the valve 10 when the upper and lower housings 46, 48 are brought together for assembly. When assembled, the upper and lower housings 46, 48 may sandwich the valve 10 to position the valve between the housings. Though not shown, a compressor housing may also include an upper housing with a first flange and a lower housing with a second flange that, when assembled, may sandwich the valve 10 to position the valve between the housings.

Referring to FIG. 1, the low pressure stage turbocharger 26 may in some ways be similar to the high pressure stage turbocharger 14. Together, the turbochargers 14 and 26 make up a two-stage turbocharging system. The turbocharger 26 may be of various types and may include a turbine 54 and a compressor 56. A bypass passage 55 may divert exhaust gasses around the turbine 54, another bypass passage 57 may divert intake air around the compressor 56, or both. And a bypass valve, such as the valve 10, may be located in the bypass passages 55, 57 to regulate fluid-flow through the bypass passages. Like the turbocharger 14, the turbocharger 26 may include a housing for the turbine 54 and compressor 56 that may have an upper and lower housing with respective flanges for sandwiching the valve 10.

In other embodiments, the engine breathing system 12 may have more, less, and/or different components than shown and described. For example, one or more coolers 58 may be located between the components, a diesel particulate filter (DPF) may be provided, and only a single turbocharger may be provided constituting a one-stage turbocharging system.

The valve 10 may be used in the engine breathing system 12 at the various locations discussed above, and may be located at other places in the engine breathing system. Wherever the valve 10 is located, the valve may control and regulate fluid-flow threat to permit (open) fluid-flow therethrough or prevent (close) fluid-flow therethrough. The valve 10 may have various configurations and components. Referring to FIGS. 2-6 and 8, in one exemplary embodiment the valve 10 may include a valve body 60, a stem 62, and a valve member 64.

The valve body 60 may constitute the casing through which fluid-flow travels in the valve 10. The valve body 60 may be a one-piece structure, or may be made of separate pieces that are subsequently put together. The valve body 60 may be composed of a material that is impervious to engine fluids such as, but not limited to, a ductile iron, a high silicon iron, a steel alloy such as a stainless steel, a ceramic, or a high temperature plastic. In some cases, the exact material will be dictated by the temperature which the valve body 60 is exposed to. The exact dimensions of the valve body 60 may vary among different internal combustion engine breathing systems, and may depend on, among other things, the type of the associated internal combustion engine and the desired fluid-flow characteristics through the valve 10. In the embodiment shown, the valve body 60 may have a port 66, a first seating surface 68, a flange 70, and one or more hubs 71.

Fluid-flow traveling through the valve 10 passes through the port 66. The port 66 may have an interior surface 72 that defines a cylindrical or elliptical shape. An inlet 74 may be located at one end of the port 66 for entering fluid-flow, and an outlet 76 may be located at the other end for exiting fluid-flow. A center axis CP of the port 66 may go through a cylindrical or elliptical centerpoint of the port.

Figure 4:
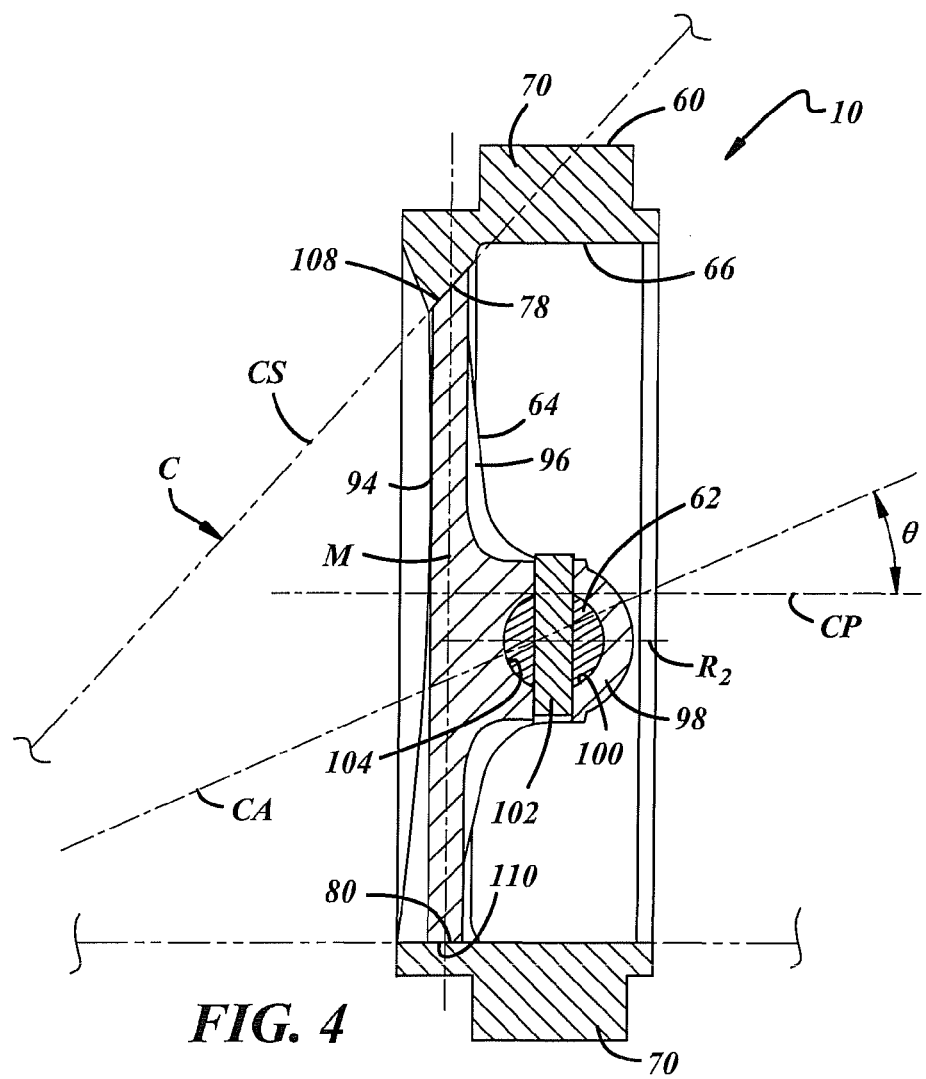
FIG. 4 is a sectional view taken along line 4-4 of FIG. 2.
Figure 5:
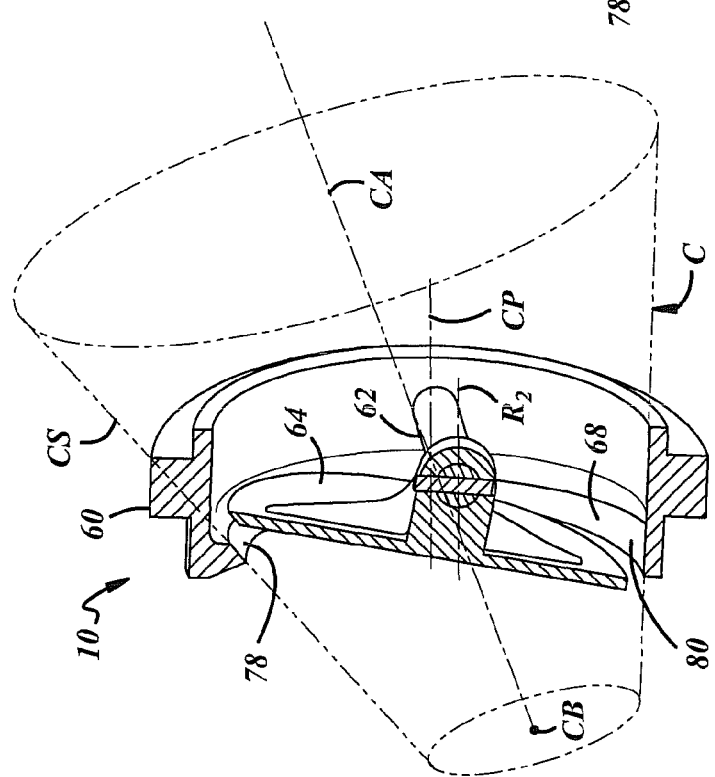
FIG. 5 is another sectional view of the valve of FIG. 2.

The first seating surface 68 contacts and mates with a complementary seating surface of the valve member 64 to form a seal therebetween. Referring to FIGS. 4 and 5, the first seating surface 68 may be shaped at least in part by an imaginary cone C (shown in phantom as a truncated cone). The cone C has a cone outer surface CS and a cone center axis CA. The center axis CA may go through an apex (not shown) of the cone C, and may go through a centerpoint of a base CB of the cone. As shown in cross-section, the cone C may be positioned so that one side of the outer surface CS lies in the horizontal direction and is parallel with the port 66. In this position, the center axis CA may be at an acute angle θ with respect to the center axis CP of the port 66. The first seating surface 68 may follow and lie along a portion of the outer surface CS. The first seating surface 68 may have different angles with respect to the center axis CP at different points along its circumference so that an upper portion 78 of the first seating surface 68 is at a different angle with respect to the center axis CP than a lower portion 80. For example, as shown in cross-section, the upper portion 78 may be at an acute angle with respect to the center axis CP, while the lower portion 80 may be parallel with the center axis CP. In other embodiments, the cone C may be positioned at different orientations whereby the upper and lower portions 78, 80 may have different angles with respect to the center axis CP. For example, the lower portion 80 need not necessarily be parallel with the center axis CP.

The flange 70 may be used to connect the valve 10 in the various locations discussed above. For example, referring to FIG. 9, the flange 70 may interfit with a connecting structure 81 that in turn connects to the first and second flanges 50, 52 in order to position the valve 10 between the upper housing 46 and the lower housing 48. As another example, the flange 70 may connect to the EGR passage 28. The flange 70 may extend continuously around a periphery of the valve 10, or may have discontinuous and separate pieces spaced around the periphery. In other embodiments, the flange 70 need not be provided, or the connecting structure 81 can be unitary with the valve body 60.

The hub 71 may be located on each side of the valve body 60 to rotatably receive the stem 62, or may be located on only one side of the valve body. The hub 71 may be unitary with the valve body 60. The hub 71 may define one or more holes 85 for receiving the stem 62.

Figure 3:
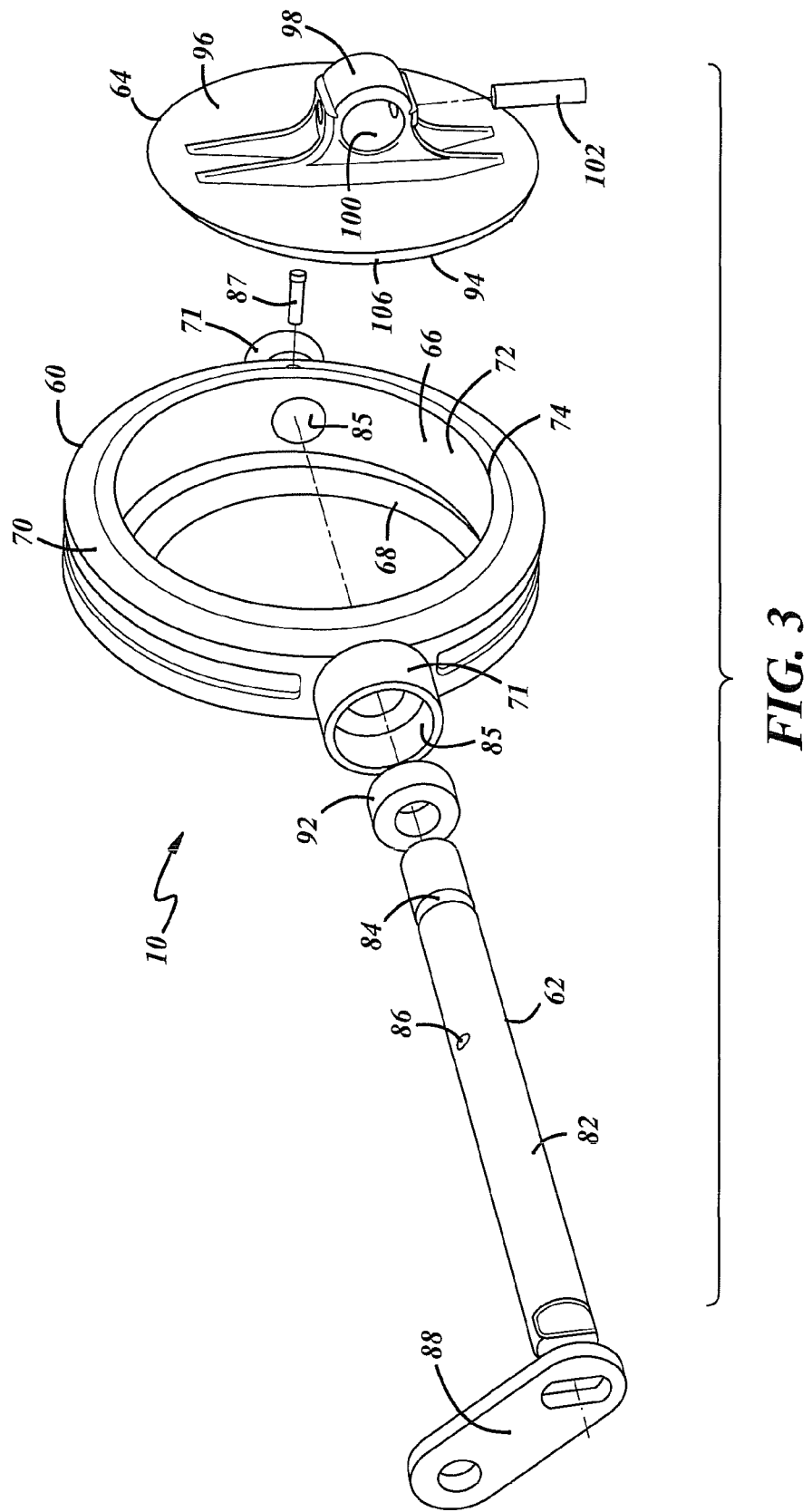
FIG. 3 is an exploded view of the valve of FIG. 2.

The stem 62 may be a rod that may be carried by the valve body 60 at a location away from the first seating surface 68. The stem 62 may connect with, and may translate rotation to the valve member 64. Referring to FIG. 3, the stem 62 may have an outer surface 82 with a recess 84 defined therein. The recess 84 may be a diametrically reduced section of the stem 62, or may be another shape. When assembled, a control pin 87 may be inserted through the valve body 60, and may be received in the recess 84. Once received, the control pin 87 limits axial slack between the stem 62 and the hub 71 to substantially prevent relative movement therebetween, such as axial movement.

In the embodiment shown, the stem 62 may also define a hole 86 for receiving a pin as will be described. At one end, a lever 88 may be connected to the stem 62 for rotation by an actuator 90 (FIG. 1). A seal 92 and/or bushing may be fit into the hubs 71 to seal the hub and/or facilitate rotation of the stem 62. In other embodiments, the stem 62 may have different configurations and components. For example, the stem 62 may include a pair of concentric rods, with one being solid and the other being hollow. In use, one of the rods may rotate while the other rod remains stationary.

Figure 2:
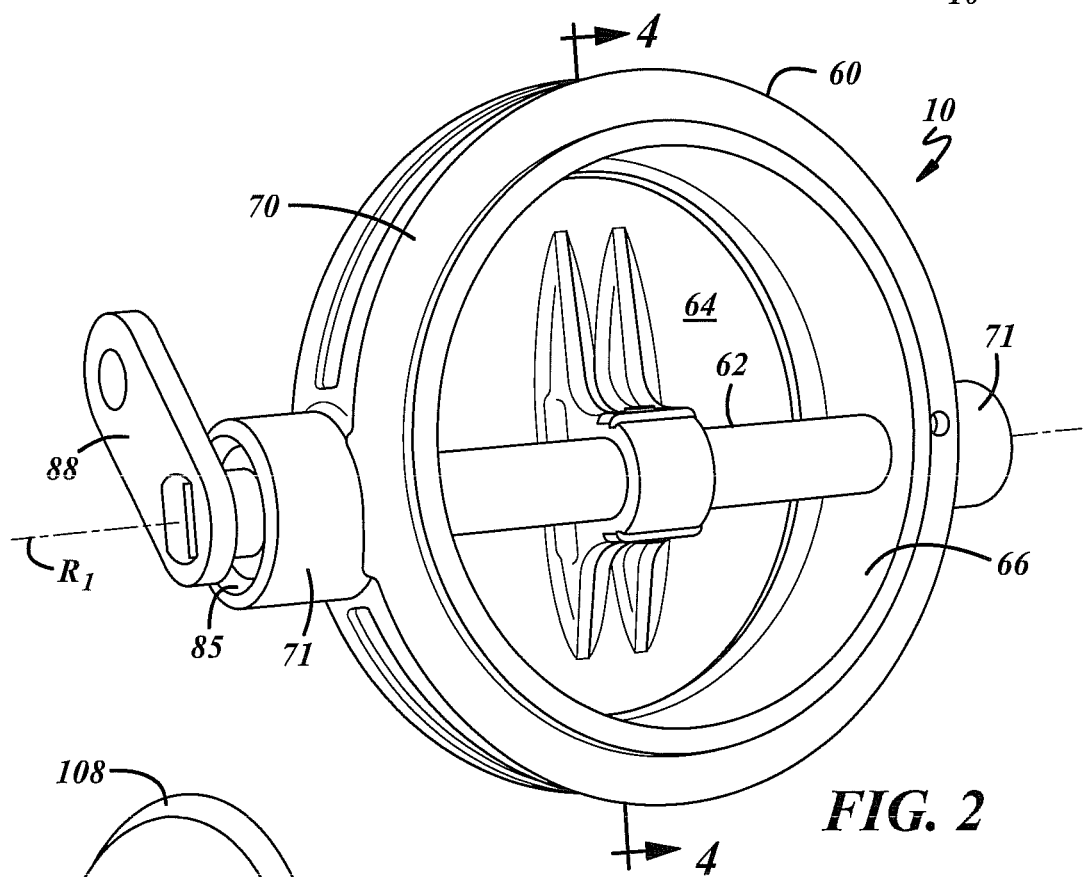
FIG. 2 is a perspective view of an exemplary embodiment of a valve that may be used in the engine breathing system of FIG. 1.
Figure 8:
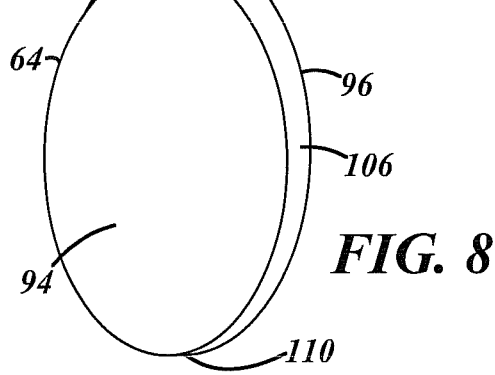
FIG. 8 is a perspective view of an exemplary embodiment of a valve member that may be used with the valve of FIG. 2.

Referring to FIGS. 2 and 5, when in use, the stem 62 and the valve member 64 rotate about an axis of rotation $R_1$. The axis of rotation $R_1$ may lie along the center axis of the stem 62. The axis of rotation $R_1$ may be radially offset from the center axis CP of the port 66 as best shown by the imaginary line $R_2$ which intersects with the axis of rotation $R_1$. That is, the axis of rotation $R_1$ may be spaced away from the center axis CP a set distance. The axis of rotation $R_1$ may be parallel with the center axis CP. Though shown in FIG. 5 as being radially offset in a downward direction, the axis of rotation $R_1$ may also be radially offset from the center axis CP in an upward direction.

The valve member 64 may be rotated by the stem 62 in order to open and close the valve 10. The valve member 64 and the stem 62 may be one-piece, or may be, as shown, separate pieces that are attached together. The valve member 64 may be sized and shaped to complement the port 66 and may be obtained by intersecting an imaginary plane with the cone C, in this case the valve member may have a disc, ellipse, or oval shape. In one example, the valve member 64 has an oval shape with a major diameter measuring between 30 and 60 mm. Referring to FIGS. 3, 4, 6, and 8, the valve member 64 may have a valve front face 94 and a valve rear face 96. As shown, the valve rear face 96 may confront fluid-flow traveling through the valve 10. A boss 98 may extend from the valve rear face 96, and may have a passage 100 for receiving the stem 62. A retaining pin 102 may be inserted through the boss 98 and through the stem 62 to interlock the stem to the valve member 64. A clearance or gap 104 may be defined between the outer surface 82 of the stem 62 and a confronting inner surface of the passage 100, and may also be defined between the outer surface of the retaining pin 102 and the confronting outer surfaces of the boss 98 and stem. In one example, the clearance 104 may be about 1/10 mm; of course other values are possible. The clearance 104 may provide space, and thus may accommodate manufacturing tolerances between the respective components, and may accommodate relative thermal expansion and contraction between the components that may occur during use with the associated fluctuations in temperature. The clearance 104 may also allow for misalignment that may occur during closing between respective seating surfaces of the valve body 60 and the valve member 64.

Referring to FIG. 4, the valve member 64 may define a valve member plane M. The valve member plane M may go through the valve member 64, and may be parallel with the valve front face 94. As shown in cross-section, when the valve member 64 is in the closed position, the valve member plane M may be directed vertically. Also, the valve member plane M may be axially offset from the axis of rotation $R_1$ when in the closed position. In other words, the valve member plane M may be spaced away from the axis of rotation $R_1$ a set distance.

Referring to FIGS. 3, 4, 6, and 8, the valve member 64 may also have a second seating surface 106 that contacts and mates with the first seating surface 68 to form a seal when the valve 10 is closed. The second seating surface 106 may complement the shape of the first seating surface 68, and like the first seating surface 68, the second seating surface 106 may be shaped at least in part by the cone C. The second seating surface 106 may follow and lie along a portion of the outer surface CS. The second seating surface 106 may have different angles with respect to the center axis CP at different points along its circumference so that an upper portion 108 is at a different angle with respect to the center axis CP than a lower portion 110. For example, as shown in cross-section, the upper portion 108 may be at an acute angle with respect to the center axis CP, while the lower portion 110 may be parallel with the center axis CP.

Referring to FIG. 1, the actuator 90 selectively rotates the stem 62 and the valve member 64 in order to open and close the valve 10. The actuator 90 may be of various types including electromechanical such as an electric motor or solenoid, pneumatic, or hydraulic. The actuator 90 may be located outside of the valve body 60, and may be operatively connected to the stem 62 via the lever 88 and through a mechanical linkage. The operation of the actuator 90 may be controlled by an electronic control unit (ECU) 107 through a closed-loop or open-loop control system using feedback control.

In use, the actuator 90 operates the valve 10 and rotates the valve member 64 between an open position (FIG. 6) and the closed position (FIG. 4). In the example of FIG. 1, when open, exhaust gasses are permitted to bypass the turbine 36. The valve member 64 is rotated to a position where it is generally parallel with the center axis CP of the port 66. When rotated to the closed position, the first and second seating surfaces 68, 106 mate to form a circumferentially continuous seal therebetween. The seal is uninterrupted by any intervening structure or component, such as may be the case in some valves where the associated stem extends through the associated seating surface. In the example where the axis of rotation $R_1$ may be axially offset from the valve member plane M, the stem 62 may extend through the valve body 60 at the location spaced axially away from the first seating surface 68. Also when in the closed position, the valve 10 has no, or very little, leakage.

The pressure exerted against the valve rear face 96 from fluid-flow may urge the valve 10 in the closed position because the pressure exerted on an upper portion of the valve may be greater than the pressure exerted on a lower portion due to the axis of rotation $R_1$ being radially offset from the center axis CP. This may help keep the upper portion 78 of the first seating surface 68 against the opposing portion of the second seating surface 106, without requiring excessive force to then move the valve 10 to the open position. From the closed position and to the open position, the valve member 64 revolves a total angle of rotation of about 90°.

Figure 10:
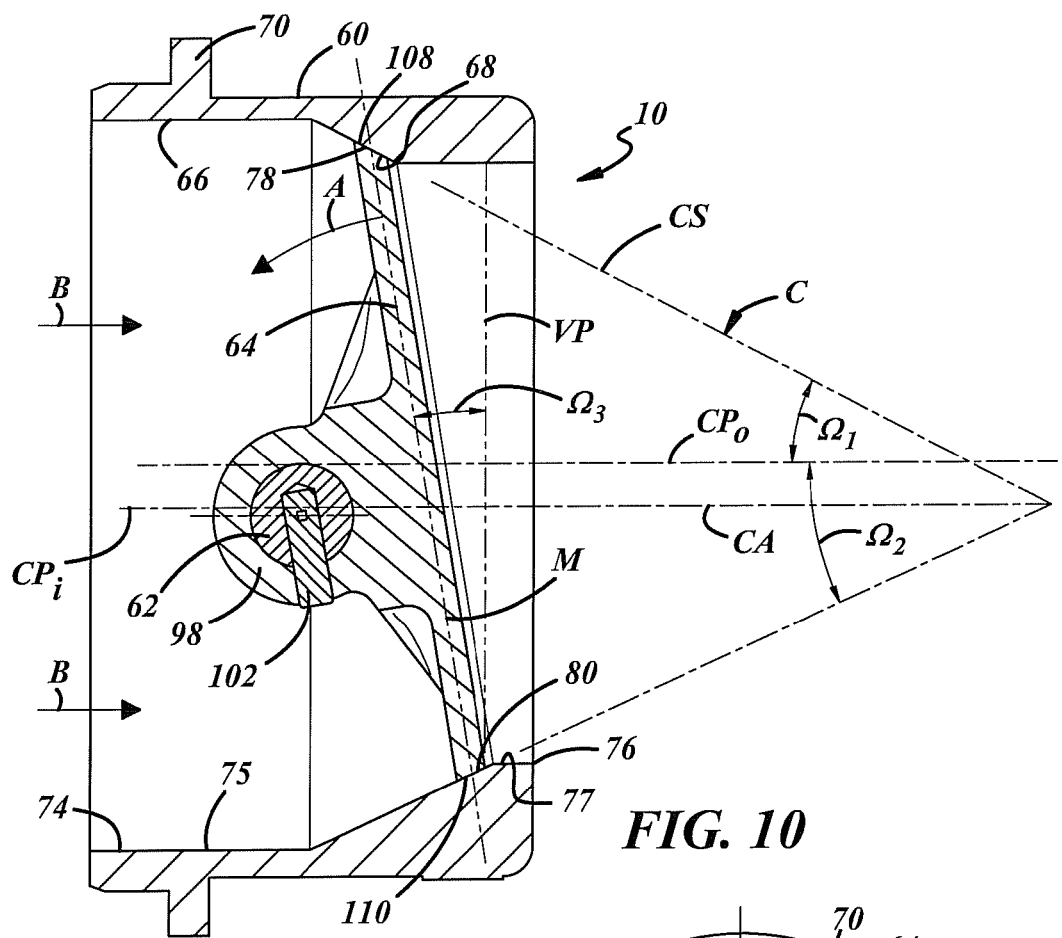
FIG. 10 is a sectional view of an exemplary embodiment of a valve that may be used in the engine breathing system of FIG. 1.
Figure 11:
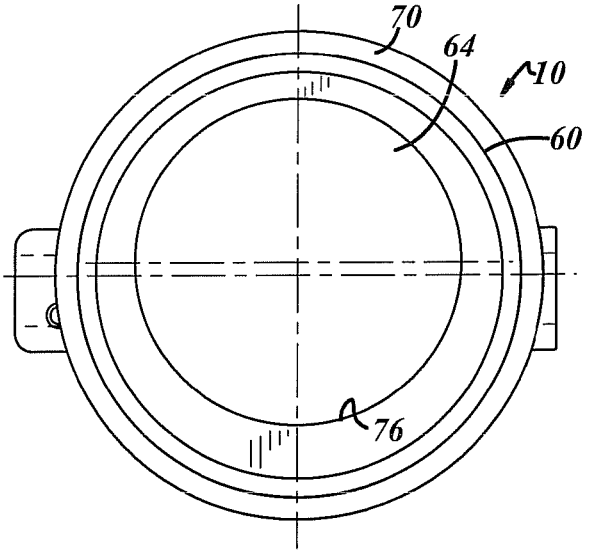
FIG. 11 is a front view of the valve of FIG. 10.
Figure 12:
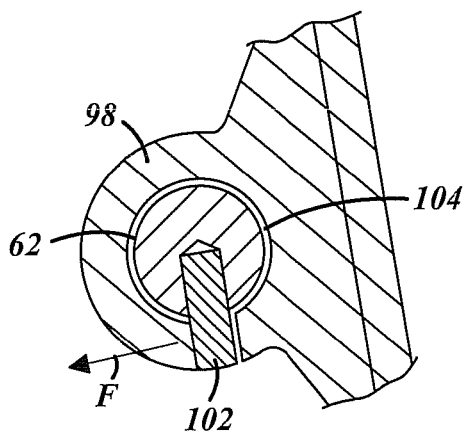
FIG. 12 is a close-up view of the valve of FIG. 10.

FIGS. 10-12 show another embodiment of the engine breathing system valve 10 in a closed position. In this embodiment, the inlet 74 may have a larger diameter value than the outlet 76. The first seating surface 68 may be shaped at least in part by the imaginary cone C (shown in phantom). The cone C may be positioned so that the center axis CA may be parallel and radially offset with respect to a port center axis $CP_o$ at an outlet portion 77. At an inlet portion 75, a port center axis $CP_i$ may be concentric with the center axis CA as shown, or may be parallel and radially offset with respect to the center axis CA. As shown in cross-section, the upper portion 78 may form an acute angle $\Omega_1$ with respect to the center axis CA and with respect to the center axis $CP_o$. In one embodiment, the angle $\Omega_1$ is less than 90° and greater than 0°, and may be about 25-30° or about 27°. The lower portion 80 may form an acute angle $\Omega_2$ with respect to the center axis CA and with respect to the center axis $CP_o$. In one embodiment, the angle $\Omega_2$ is less than 90° and greater than 0°, and may be about 25-30° or about 27°. The angles $\Omega_1$ and $\Omega_2$ may, though need not, have the same value which may facilitate machining and manufacture of the first and second seating surfaces 68, 106.

Though not shown in FIGS. 10-12, the axis of rotation $R_1$ of the stem 62 may be radially offset from the center axis CA, and the port center axes $CP_i$ and $CP_o$ in the downward direction.

In one example of this embodiment, the valve member 64 has an oval shape with a major diameter of about 44 mm and a minor diameter of about 43 mm. In this embodiment, the retaining pin 102 may be inserted through a single side of the boss 98 and partly through the stem 62 to interlock the stem and the valve member 64. As shown best in FIG. 11, the valve member 64 may be positioned eccentric in the valve body 60 with respect to the flange 70. When in the closed position, the valve member plane M may be tilted and may be directed at an acute angle $\Omega_3$ with respect to a vertical axis VP of the port 66; in one embodiment, the angle $\Omega_3$ may be less than 90° and greater than 0°, and may be about 6-12° or about 9°. The second seating surface 106 may complement the shape of the first seating surface 68. As shown, the upper portion 108 may form the angle $\Omega_1$ with respect to the center axis CA and with respect to the center axis $CP_o$. The lower portion 110 may form the angle $\Omega_2$ with respect to the center axis CA and with respect to the center axis $CP_o$. In use, the valve member 64 may rotate in a direction A, and gasses may come from a direction B.

In some cases, when the engine breathing system valve 10 of FIGS. 10-12 is approaching completely close or almost completely close, the resulting gas pressure biases the valve member 64 so that the second seating surface 106 contacts the first seating surface 68 at a single point rather than at all points (i.e., flush) with respect to each other, causing an incomplete close or misalignment between the seating surfaces 68, 106. The single point may occur at the lower portion 110, while the upper portion 108 forms a slight gap with respect to the upper portion 78 of the first seating surface 68. Oftentimes, an additional torque may be required via the actuator 90 to bring the first and second seating surfaces 68, 106 flush and further bring the engine breathing system valve 10 to complete close. Referring to FIG. 12, the position of the retaining pin 102 and the clearance 104 may help prevent the incomplete close from occurring. Orienting and positioning the retaining pin 102 generally toward the lower portion 110 as shown in FIGS. 10 and 12 and with the clearance 104 may generate a reaction force F generally perpendicular to the lengthwise dimension of the retaining pin 102. The reaction force F may, in cooperation with the resulting gas pressure against the valve member 64, bring the upper portion 108 flush against the upper portion 78. The reaction force F may cause flush contact between the first and second seating surfaces 68, 106 without the need for additional torque from the actuator 90.

Figure 7:
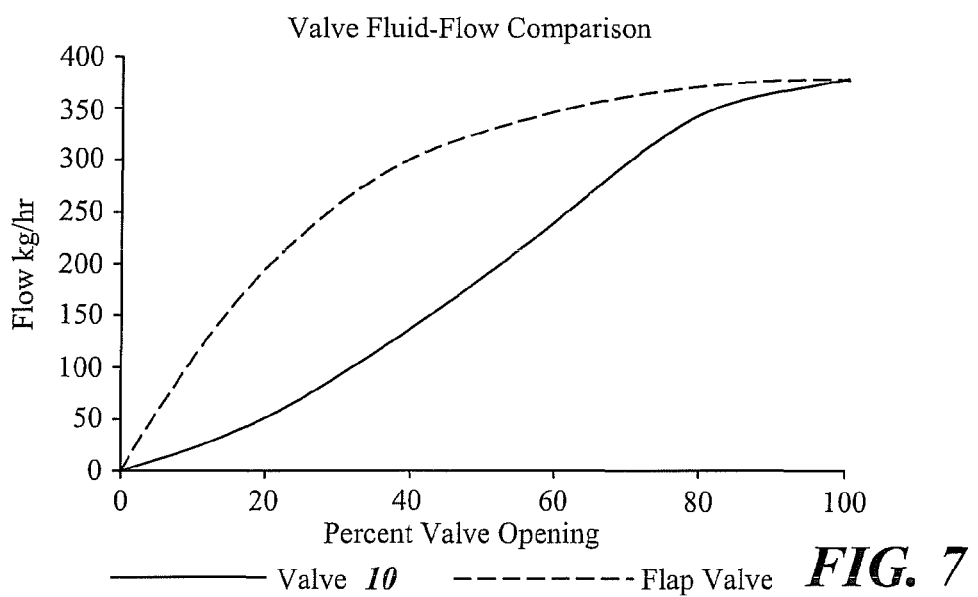
FIG. 7 is a graph comparing mass fluid-flows of the valve of FIG. 2 and a flap valve.

FIG. 7 is a graph showing the mass fluid-flow rate of the valve 10 in use, versus that of a conventional flap valve. As can be observed, the valve 10 has an improved resolution as compared to the flap valve. This may be desirable in some cases to avoid a relatively sudden rush of fluid-flow through the valve 10 and through the associated downstream components. It should be noted that the results of FIG. 7 are theoretical and that all experiments may not yield this exact data.

The above description of embodiments of the invention is merely exemplary in nature and, thus, variations thereof are not to be regarded as a departure from the spirit and scope of the invention.

What is claimed is:

1. A product comprising:
an engine breathing system valve (10) located in a passage (28, 32, 34, 40, 42, 43, 45, 55, 57) of an engine breathing system (12) to regulate fluid-flow in the passage (28, 32, 34, 40, 42, 43, 45, 55, 57), the engine breathing system valve (10) comprising:
a valve body (60) having a port (66) and having a seating surface (68) lying along a cone outer surface (CS) of an imaginary cone (C), the imaginary cone (C) having a cone center axis (CA) which is at an acute angle (θ) with respect to a center axis (CP) of the port (66) so that, in cross-section, an upper portion (78) of the seating surface (68) is at a different angle with respect to the port center axis (CP) than a lower portion (80) of the seating surface (68);
a stem (62) rotatably carried by the valve body (60) at a location away from the seating surface (68), the stem (62) having an axis of rotation ($R_1$) being radially offset from the port center axis (CP);
a valve member (64) connected to the stem (62) to rotate about the stem (62), wherein the valve member (64) comprises a second seating surface (106), and wherein the valve member (64) is a single continuous component, the valve member (64) having a valve member plane (M) defined parallel to a valve face (94) of the valve member (64) and being, when in a closed position, axially offset from the axis of rotation ($R_1$);
wherein the valve member (64) has a boss (98) extending away from a valve rear face (96), the boss (98) defining a passage (100) therein for receiving the stem (62), and a retaining pin (102) is inserted into the boss (98) and into the stem (62) to connect the stem (62) to the valve member (64); and
wherein a clearance (104) is defined between an outer surface (82) of the stem (62) and an inner surface of the passage (100), the clearance (104) accommodating relative thermal expansion and contraction between the stem (62) and the boss (98).

2. A product as set forth in claim 1 wherein the engine breathing system valve (10) is located within a bypass passage (40, 42, 55, 57) of a turbocharger (14, 26).

3. A product as set forth in claim 1 wherein the engine breathing system valve (10) is located within an EGR passage (28, 43, 45) of an EGR assembly (16, 35, 37).

4. A product as set forth in claim 1 wherein, in cross-section, the upper portion (78) is at an acute angle with respect to the port center axis (CP) and the lower portion (80) is parallel with respect to the port center axis (CP).

5. A product as set forth in claim 1 wherein the valve body (60) has a hub (71) located on a side of the valve body (60), the hub (71) receiving the stem (62) and permitting the stem (62) to rotate therein.

6. A product as set forth in claim 5 wherein a recess is defined in an outer surface (82) of the stem (62), and a control pin (87) is received in the recess (84) to substantially prevent relative movement between the stem (62) and the hub (71).

7. A product as set forth in claim 1 wherein the seating surface (68) is circumferentially continuous with no intervening structures.

8. A product as set forth in claim 1 wherein a flange (70) extends at least partly around a periphery of the valve body (60) in order to install the engine breathing system valve (10) in the passage (28, 32, 34, 40, 42, 43, 45, 55, 57) of the engine breathing system (12).

9. A product as set forth in claim 1 wherein the second seating surface (106) is located around a periphery of the valve member (64) and complementing the seating surface (68) of the valve body (60) so that the second seating surface (106) also lies along the cone outer surface (CS) of the imaginary cone (C) and so that, in cross-section, an upper portion (108) of the second seating surface (106) is at an acute angle with respect to the port center axis (CP) and a lower portion (110) of the second seating surface (106) is parallel with respect to the port center axis (CP).

10. A product comprising:
an engine breathing system valve (10) located in a passage (28, 32, 34, 40, 42, 43, 45, 55, 57) of an engine breathing system (12) to regulate fluid-flow in the passage (28, 32, 34, 40, 42, 43, 45, 55, 57), the engine breathing system valve (10) comprising:
a valve body (60) having a port (66) and having a seating surface (68) lying along a cone outer surface (CS) of an imaginary cone (C), the imaginary cone (C) having a cone center axis (CA) which is parallel to a center axis (CP) of the port (66) so that, in cross-section, an upper portion (78) of the seating surface (68) is at a first acute angle ($\Omega_1$) with respect to the port center axis (CP) and a lower portion (80) of the seating surface (68) is at a second acute angle ($\Omega_2$) with respect to the port center axis (CP);
a stem (62) rotatably carried by the valve body (60) at a location away from the seating surface (68), the stem (62) having an axis of rotation ($R_1$) being radially offset from the port center axis (CP); and
a valve member (64) connected to the stem (62) to rotate about the stem (62), the valve member (64) having a valve member plane (M) defined parallel to a valve face (94) of the valve member (64) and being, when in a closed position, at a third acute angle ($\Omega_3$) with respect to a vertical axis (VP) of the port (66).

11. A product as set forth in claim 10 wherein the engine breathing system valve (10) is located within a bypass passage (40, 42, 55, 57) of a turbocharger (14, 26).

12. A product as set forth in claim 10 wherein the engine breathing system valve (10) is located within an EGR passage (28, 43, 45) of an EGR assembly (16, 35, 37).

13. A product as set forth in claim 10 wherein the cone center axis (CA) is radially offset from the port center axis (CP).

14. A product as set forth in claim 10 wherein a second seating surface (106) is located around a periphery of the valve member (64) and complementing the seating surface (68) of the valve body (60) so that the second seating surface (106) also lies along the cone outer surface (CS) of the imaginary cone (C) and so that, in cross-section, an upper portion (108) of the second seating surface (106) is at the acute angle ($\Omega_1$) with respect to the port center axis (CP) and a lower portion (110) of the second seating surface (106) is at the acute angle ($\Omega_2$) with respect to the port center axis (CP).

15. A product as set forth in claim 10 wherein the first and the second acute angles ($\Omega_1$, $\Omega_2$) are about 25-30° with respect to the port center axis (CP).

16. A product as set forth in claim 10 wherein the third acute angle ($\Omega_3$) is about 6-12° with respect to the vertical axis (VP) of the port (66).

17. A product comprising:
an upper housing (46) of a turbocharger component (36, 38, 54, 56);
a lower housing (48) of the turbocharger component (36, 38, 54, 56); and
an engine breathing system valve (10) positioned between the upper housing (46) and the lower housing (48) to regulate fluid-flow in the turbocharger component (36, 38, 54, 56), the engine breathing system valve (10) comprising:

a valve body (60) having a port (66) and having a seating surface (68) lying along a cone outer surface (CS) of an imaginary cone (C), the imaginary cone (C) having a cone center axis (CA) which is parallel to a center axis (CP) of the port (66) so that, in cross-section, an upper portion (78) of the seating surface (68) is at an acute angle ($\Omega_1$) with respect to the port center axis (CP) and a lower portion (80) of the seating surface (68) is at an acute angle ($\Omega_2$) with respect to the port center axis (CP);

a stem (62) rotatably carried by the valve body (60) at a location away from the seating surface (68), the stem (62) having an axis of rotation ($R_1$) being radially offset from the port center axis (CP); and a valve member (64) connected to the stem (62) to rotate about the stem (62), the valve member (64) having a valve member plane (M) defined parallel to a valve face (94) of the valve member (64) and being, when in a closed position, at an acute angle ($\Omega_3$) with respect to a vertical axis (VP) of the port (66).

* * * * *